(12) United States Patent
Huang et al.

(10) Patent No.: US 10,719,648 B2
(45) Date of Patent: Jul. 21, 2020

(54) SYSTEM AND METHOD FOR SYSTEM-LEVEL PARAMETER ESTIMATION

(71) Applicant: TAIWAN SEMICONDUCTOR MANUFACTURING CO., LTD., Hsinchu (TW)

(72) Inventors: Tze-Chiang Huang, Saratoga, CA (US); Kai-Yuan Ting, San Jose, CA (US); Sandeep Kumar Goel, Dublin, CA (US); Yun-Han Lee, Hsinchu County (TW); Shereef Shehata, San Ramon, CA (US); Mei Wong, Saratoga, CA (US)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 969 days.

(21) Appl. No.: 15/260,143

(22) Filed: Sep. 8, 2016

(65) Prior Publication Data
US 2017/0076029 A1 Mar. 16, 2017

Related U.S. Application Data

(60) Provisional application No. 62/217,783, filed on Sep. 11, 2015.

(51) Int. Cl.
*G06F 17/50* (2006.01)
*G06F 30/367* (2020.01)
*G06F 30/33* (2020.01)
*G06Q 50/18* (2012.01)
*G06F 115/08* (2020.01)
*G06F 119/06* (2020.01)

(52) U.S. Cl.
CPC ............ *G06F 30/367* (2020.01); *G06F 30/33* (2020.01); *G06F 2115/08* (2020.01); *G06F 2119/06* (2020.01); *G06Q 50/184* (2013.01)

(58) Field of Classification Search
CPC ............ G06F 17/5036; G06F 17/5022; G06F 2217/78; G06F 2217/66; G06Q 50/184
USPC ........................................................ 716/109
See application file for complete search history.

(56) References Cited

U.S. PATENT DOCUMENTS

2006/0218512 A1* 9/2006 Arslan ................... G06N 20/00
716/102
2007/0083831 A1* 4/2007 Hamilton ............ G06F 17/5045
716/105

OTHER PUBLICATIONS

Pending U.S. Appl. No. 15/201,328, filed Jul. 1, 2016.

* cited by examiner

*Primary Examiner* — Jack Chiang
*Assistant Examiner* — Brandon Bowers
(74) *Attorney, Agent, or Firm* — Maschoff Brennan

(57) ABSTRACT

A method is disclosed that includes providing an IP bank, an application bank, and a technology bank; generating a hierarchical table based on the IP bank and the application bank; performing an estimation of at least one of a performance value, a power value, an area value and a cost value, which corresponds to the hierarchical table, by using the technology bank, to output an result data as a basis of fabrication of a system.

20 Claims, 3 Drawing Sheets

US 10,719,648 B2

SYSTEM AND METHOD FOR SYSTEM-LEVEL PARAMETER ESTIMATION

RELATED APPLICATIONS

This application claims priority to U.S. Provisional Application No. 62/217,783, filed Sep. 11, 2015, which is herein incorporated by reference.

BACKGROUND

As integrated circuit (IC) technology advances, the complexity of chips increases and higher performance is required. As the industry moves toward a system on a chip (SoC) model, uncertainties including, for example, interface requirements and integration of analog blocks need to be addressed and resolved.

As chip complexity increases, the level of risk increases as well. Development cycles increase along with the complexity of the ICs, delaying product introduction cycles.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
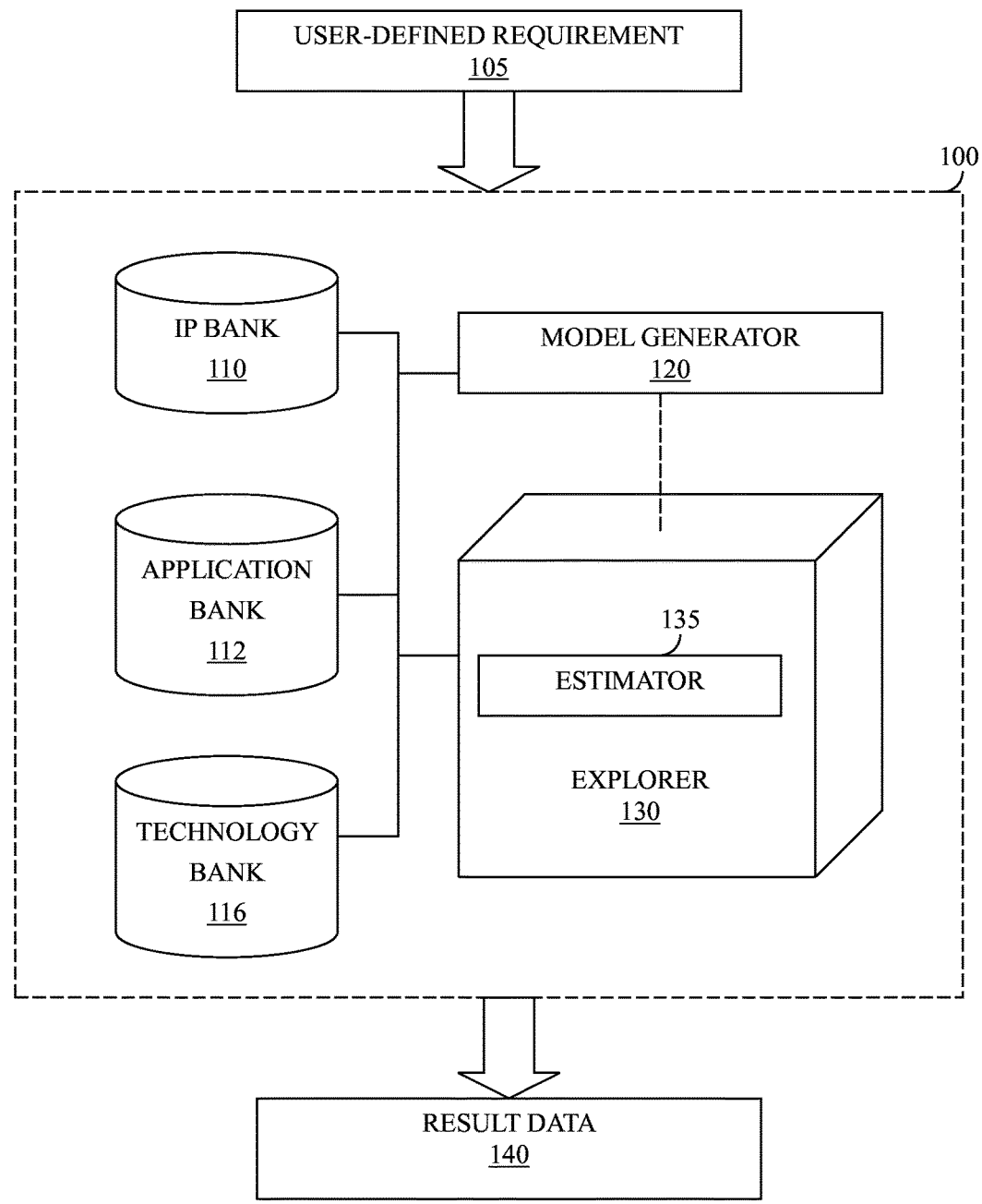
FIG. 1 is a schematic diagram of an integrated platform in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram of an integrated platform 100 in accordance with various embodiments of the present disclosure. In some embodiments, the integrated platform 100 includes, for example, virtual platform, virtual machine (VM), and so forth. For illustration, the integrated platform 100 receives a user-defined requirement 105 and outputs result data 140. The user-defined requirement 105, in some embodiments, corresponds to commands, instructions, signals, and/or the like. In some embodiments, the integrated platform 100 is implemented by a system, a computer, a processing unit, and/or the like.

In some embodiments, the user-defined requirement 105 includes an application requirement and/or a system requirement. The application requirement includes, for example, a set of applications of a product. For instance, the product is a multimedia device, and a set of applications of the multimedia device includes audio playback, video playback, and/or the like. The system requirement includes, for example, performance, power, area and cost (PPAC) priority of the product.

In some embodiments, the aforementioned product includes at least one integrated circuit and provides an entire system in the integrated circuit (IC), which, in some embodiments, is referred to as a system on a chip (SOC) or system on integrated circuit (SOIC) device. The SOC device includes, for example, all of the circuitry configured to implement a cell phone, personal data assistant (PDA), digital VCR, digital camcorder, digital camera, MP3 player, and/or the like, in a single integrated circuit.

For expediting the development of mask sets for fabricating integrated circuits (ICs), chip designers typically use standard cells from cell libraries. For illustration, the cells contain geometrical objects including, for example, polygons (boundaries), paths, and/or the like. In some embodiments, these standard cells are referred to as "intellectual property (IP)." For simplicity of illustration, the term "IP" is used in the following discussion. Various terms used to indicate the standard cells are within the contemplated scope of the present disclosure.

For illustration, complex and mixed ICs require various analog and/or digital IP components. In most cases, all required IPs come from different sources. With the required IPs, IC manufacturers, fabrication houses and foundries develop process technologies with some considerations including, for example, high performance, low power, small area and low cost, to meet customer requirements. In some embodiments, the integrated platform 100 is configured to estimate the performance, power, area and cost (PPAC), for improvements of processes and/or devices. The estimation of the PPAC, which is performed by the integrated platform 100, will be illustrated below.

For illustration in FIG. 1, an IP bank 110, an application bank 112, a technology bank 116, a model generator 120, and an explorer 130 are implemented on, or included in, the integrated platform 100.

Figure 2:
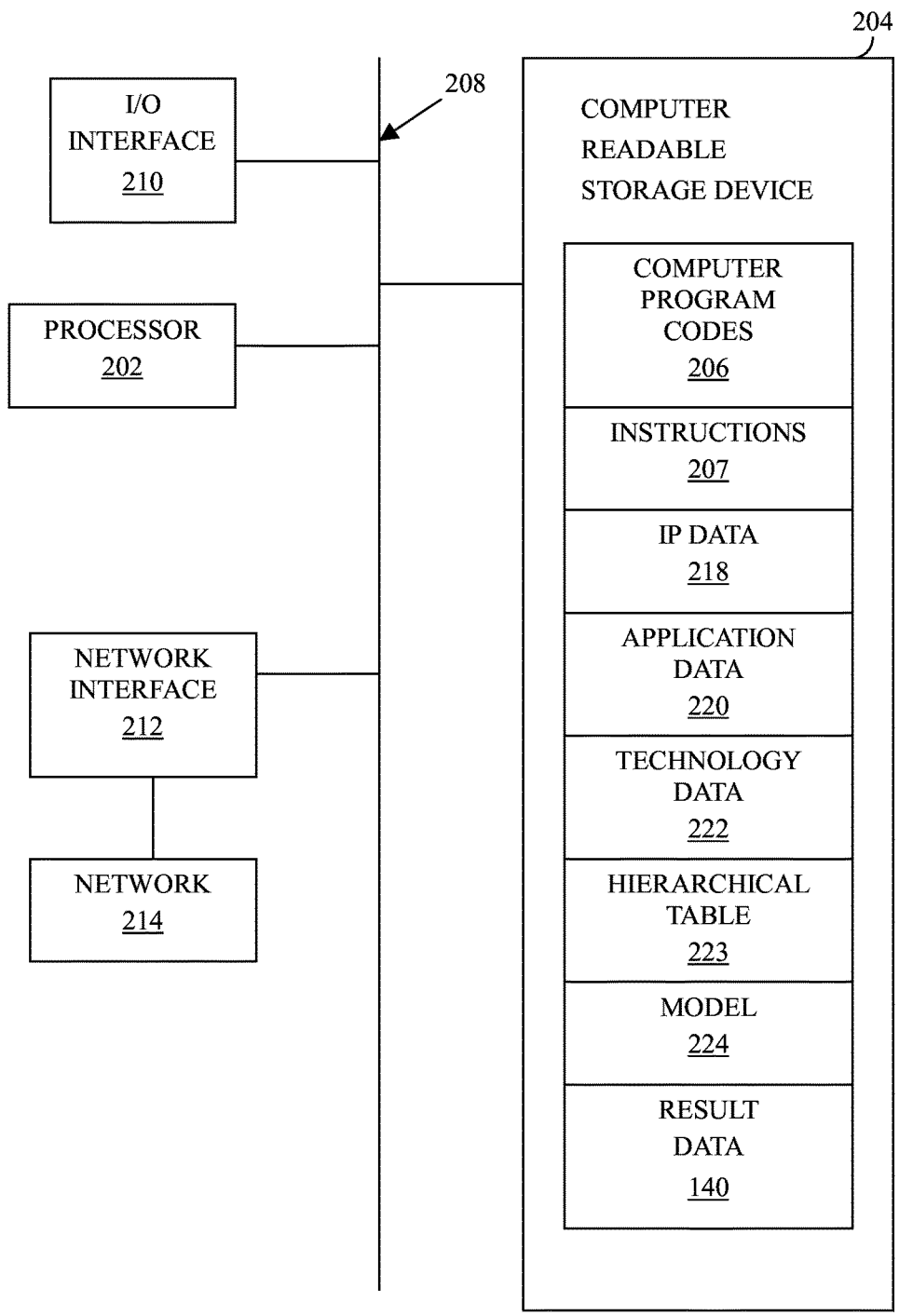
FIG. 2 is a schematic diagram of a system corresponding to the integrated platform in FIG. 1, in accordance with various embodiments of the present disclosure.

In some embodiments, the IP bank 110 is implemented by hardware which is configured in a storage device 204 as labeled in FIG. 2, for storing data associated with IPs and configurations of the IPs. For illustration, the IP bank 110 stores IP data 218 as labeled in FIG. 2. The IP data 218 in FIG. 2 includes data associated with IPs and configurations of the IPs. In some embodiments, the IPs indicate, or are associated with, various integrated circuits and/or devices, including, for example, analog circuits, logic circuits, mixed signal circuits, radio frequency (RF) devices, memory devices, image sensors, and processor devices. For instance, the processor devices include, for example, ARM A7-C1: Single core (L1: 64 KB, L2: 512 KB), ARM A7-C2: Dual core (L1: 64 KB, L2: 512 KB), ARM A7-C4: Quad core (L1: 64 KB, L2: 512 KB), ARM M3, GPU Mali, and/or the like. For another instance, the memory devices include, for example, low-power DDR (LPDDR), LPDDR2, LPDDR3, SRAM, and/or the like.

The aforementioned implementations of the IP bank 110 and the IPs are given for illustrative purposes. Various implementations of the IP bank 110 and the IPs are within the contemplated scope of the present disclosure. For example, in various embodiments, the IP bank 110 is implemented by software, and/or indicates information associated with IPs and configurations thereof.

In some embodiments, the application bank 112 in FIG. 1 is implemented by hardware which is configured in the storage device 204 in FIG. 2. For illustration, the application bank 112 stores application data 220 as labeled in FIG. 2. The application data 220 in FIG. 2 includes data indicating relations between applications of products and usages of the IPs, in some embodiments. For illustration, the product is a multimedia device. The application of the multimedia device includes, for example, MP3 playback. The usage of the IPs indicates that a processor device ARM M3 and a memory device LPDDR3, as discussed above, perform the functions corresponding to the MP3 playback, in which the processor device ARM M3 directly accesses MP3 data from the memory device LPDDR3. Alternatively, for another illustration, the application of the multimedia device includes MP3 playback, and another usage of the IPs indicates that the processor device ARM M3, memory devices SRAM and LPDDR3, and a direct memory access (DMA) operate together to perform the functions corresponding to the MP3 playback. In some embodiments, DMA copies the MP3 data from the memory device LPDDR3 to SRAM, and the processor device ARM M3 access the MP3 data from the memory device SRAM. In some embodiments, the DMA is referred to as a feature of computer systems that allows some hardware subsystems to access main system memory independently of central processing unit (CPU).

The aforementioned implementations of the application bank 112 are given for illustrative purposes. Various implementations of the application bank 112 are within the contemplated scope of the present disclosure. For example, in various embodiments, the application bank 112 is implemented by software, and/or indicates relations between applications of products and usages of the IPs.

In some embodiments, the technology bank 116 in FIG. 1 is implemented by hardware which is configured in the storage device 204 as labeled in FIG. 2. For illustration, the technology bank 116 stores technology data 222 as labeled in FIG. 2. The technology data 222 in FIG. 2 includes data associated with process technology and relevant parameters of fabrications of the IPs. For illustration, the fabrication of the IPs involves various process technologies including, for example, fabrication process of 0.25 µm, 0.18 µm, 0.15 µm, 0.13 µm, 0.11 µm, 90 nm, 65 nm, 40 nm, 28 nm and/or the like. For illustration, the 28-nm process technology includes 28-nm high performance compact mobile computing (28HPC), and/or the like. In some embodiments, the 28HPC technology is used for mainstream smart phones, DTV, storage and SoC applications. The 28HPC technology enables circuit design to employ smaller die size, less over-design and extraordinary power reduction, compared to those in some approaches.

In some embodiments, the IPs involve various designs including, for example, complementary metal-oxide-semiconductor field effect transistor (CMOSFET), strained CMOSFET, fin-structure FET (FinFET), high-voltage transistor, and/or the like. Corresponding to the aforementioned designs, relevant semiconductor design parameters include, for example, threshold voltage, breakdown voltage, current consumption, switching speed, and/or the like.

The aforementioned implementations of the technology bank 116 are given for illustrative purposes. Various implementations of the technology bank 116 are within the contemplated scope of the present disclosure. For example, in various embodiments, the technology bank 116 is implemented by software, and/or indicates information associated with process technology and relevant parameters of the IPs.

As discussed above, the process technology indicates processes of manufacturing, for example, semiconductor devices corresponding to the IPs. In some embodiments, the process technology is associated with, for example, deposition, removal, patterning, and modification of electrical properties (e.g., doping). Deposition is a process, in some embodiments, that grows, coats, and/or transfers a material onto the wafer. Deposition processes include, for example, physical vapor deposition (PVD), chemical vapor deposition (CVD), electrochemical deposition (ECD), molecular beam epitaxy (MBE), atomic layer deposition (ALD), and/or the like. Removal is a process, in some embodiments, that removes material from the wafer, and that includes, for example, etching processes. For example, removal processes include chemical mechanical planarization (CMP) used to planarize surfaces of semiconductor structures. Patterning, also referred to as lithography, is a process, in some embodiments, that shapes deposited materials. Patterning processes include, for example, using photoresist material to selectively mask portions of semiconductor structures, exposing the semiconductor structures to a particular wavelength of light, and then washing away the unexposed regions with a developer solution. Modification of electrical properties, in some embodiments, includes doping selected regions by diffusion and/or ion implantation. For illustration, the doping processes are followed by an anneal process, including, for example, a furnace anneal or rapid thermal anneal (RTA), in order to activate the implanted dopant.

For illustration in FIG. 1 and FIG. 2, in response to the received user-defined requirement 105, the model generator 120 generates a model 224 (as labeled in FIG. 2) based on at least the IP bank 110. The model 224 is associated with IP hierarchy. In some embodiments, the model 224 includes a hierarchical PPAC representation for a given IP and/or a given subsystem. In some embodiments, the given IP is associated with at least one integrated circuit. In some embodiments, the subsystem includes at least one processing device including, for example, central processing unit (CPU), digital signal processor (DSP), and/or the like.

For illustration in FIG. 1 and FIG. 2, the explorer 130 receives the model 224 as shown in FIG. 2, from the model generator 120. In some embodiments, based on the model 224 as shown in FIG. 2, the explorer 130 accesses the technology bank 116 to simulate one or more corresponding fabrication processes for at least one architecture. In some embodiments, the architecture indicates configurations, functions and/or electrical characteristics of integrated circuits of the product as discussed above.

In some embodiments, the explorer 130 includes an estimator 135. The estimator 135 is configured to estimate a performance value, a power value, an area value, a cost value, or the combination thereof, for the architecture as discussed above, based on the model 224 as shown in FIG. 2. Based on at least one of the estimated values, the estimator 135 removes at least one defective architecture that does not meet the user-defined requirement 105. For illustration, when an estimated power value is higher than a predetermined power value corresponding to the user-defined requirement 105, the estimator 135 identifies that the architecture indicating configurations, functions and/or electrical characteristics of integrated circuits of the product, as discussed above, is defective, and the estimator 135 removes the defective architecture.

After the explorer 130 removes the defective architecture, the integrated platform 100 outputs the result data 140 for analysis and/or evaluation. In some embodiments, the result data 140 includes architecture-technology configuration ranking corresponding to the PPAC, the PPAC estimation, and/or the like. For illustration, when the power value of an architecture constructed based on one selected technology is a lowest power value, the architecture-technology configuration ranking in the result data 140 shows that the architecture is a highest ranking architecture using the selected technology. In various embodiments, the result data 140 is used for early estimation of the product before the product is designed and/or manufactured.

FIG. 2 is a schematic diagram of a system 200 implementing the integrated platform 100 of FIG. 1, in accordance with some embodiments of the present disclosure. Labels for different components of the system 200 are illustratively shown in FIG. 2. In some embodiments, the system 200 is implemented in or by a computer that implements the integrated platform 100 of FIG. 1. Various apparatuses or devices to implement the system 200 are within the contemplated scope of the present disclosure.

For illustration, the system 200 includes a processor 202 and a non-transitory computer readable storage device 204 storing computer program codes 206. In some embodiments, the processor 202 is configured to execute the computer program codes 206 stored in the computer readable storage device 204, in order for performing operations, including, for example, as illustrated in FIG. 3.

Figure 3:
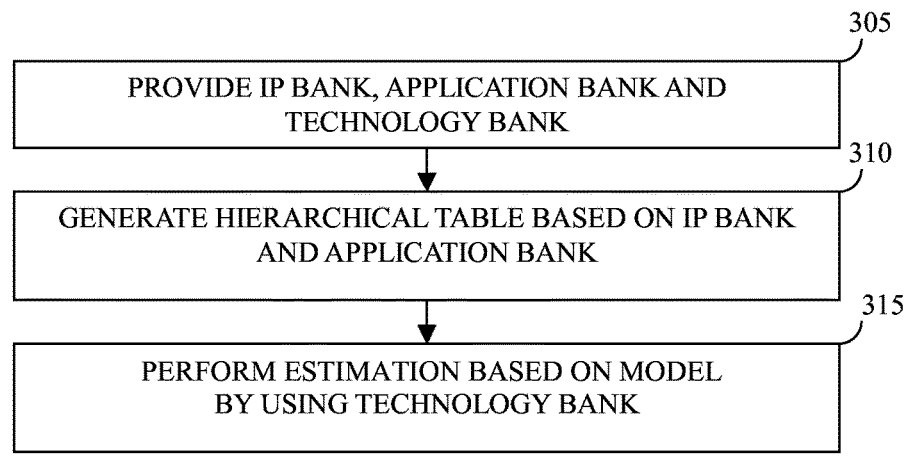
FIG. 3 is a flow chart of a method implemented by the system of FIG. 2 in accordance with various embodiments of the present disclosure.

In some embodiments, the computer readable storage device 204 stores the computer program codes 206 for performing operations including operations in FIG. 3. In various embodiments, the computer readable storage device 204 also stores various data, in addition to the computer program codes 206, for performing operations including, for example, operations in FIG. 3.

In alternative embodiments, the computer readable storage device 204 also stores data generated, and/or required, during performing operations including, for example, operations in FIG. 3. For illustration, the data generated, and/or required, during performing operations in FIG. 3 include IP data 218, application data 220, technology data 222, model 224 and/or a set of executable instructions, as will be illustrated below.

For illustration in FIG. 2 with reference to FIG. 1, in response to the user-defined requirement 105, the processor 202 is configured to execute the computer program codes 206, in order to perform operations and/or functions of the model generator 120, the explorer 130, and/or the estimator 135 as illustrated in FIG. 1.

In some embodiments, according to the user-defined requirement 105 in FIG. 1, the processor 202 executes the computer program codes 206 to utilize one or more of the IP data 218 and the application data 220 to create a hierarchical table 223. In some embodiments, the IP data 218 are associated with configurations of blocks of the IPs, in which the blocks are referred to as electronic components in some embodiments. In some embodiments, the application data 220 indicate relations between applications of products and usages of the IPs. For illustration, when the user-defined requirement 105 corresponds to a specific application of a product, the processor 202 executes the computer program codes 206, according to the user-defined requirement 105, to access the application data 220 in order to collect suitable IPs for constituting the product. According to the user-defined requirement 105, the processor 202 executes the computer program codes 206 to further access the IP data 218 to obtain data associated with configurations of blocks of the suitable IPs, in order to create the hierarchical table 223.

In some embodiments, the hierarchical table 223 includes a subsystem level, an IP level, and a block level. The subsystem level defines that each subsystem includes IPs as discussed above. The IP level defines that each IP includes blocks (not shown). The block level defines parameters of each block. In some embodiments, the subsystem includes at least one processing device including, for example, central processing unit (CPU), digital signal processor (DSP), and/or the like. In some embodiments, each one of the blocks, indicating at least one electronic component, includes technology parameters, implementation parameters, generic parameters, cost parameters, and/or the like. For illustration, one block in the CPU includes, for example, technology parameters, implementation parameters, generic parameters, cost parameters, and/or the like.

Then, the processor 202 executes the computer program codes 206 to generate the model 224 according to the hierarchical table 223. In some embodiments, the hierarchical table 223 includes the parameters as discussed above, and the processor 202 executes the computer program codes 206 to process the parameters in the hierarchical table 223, in order to construct a database as the model 224, or included in the model 224. In some embodiments, the model 224 includes a database (not shown) having application specification, technology specification and design specification of the at least one device discussed above.

In some embodiments, based on the model 224, the processor 202 executes the computer program codes 206 to create at least one architecture (not shown). For illustration, the application requirement indicates MP3 playback that, for example, has 128K bits rate, 4 MB file size, 4 minutes length, and stores data in the memory device LPDDR3. For such application requirement, the model 224 includes a database having specifications of a processor device ARM M3, a direct memory access (DMA), and memory devices LPDDR3 and SRAM. The processor 202 executes the computer program codes 206 to create an architecture defining that the processor device ARM M3 accesses data from the memory device LPDDR3. Alternatively and/or additionally, the processor 202 executes the computer program codes 206 to create another architecture defining that the DMA is used to copy the data from the memory device LPDDR3 to the memory device SRAM, and then the processor device ARM M3 accesses data from the memory device SRAM.

As discussed above, in some embodiments, the architecture indicates configurations, functions and/or electrical characteristics of integrated circuits of the product. In some embodiments, the architecture includes a number of the IPs as discussed above.

In some embodiments, the processor 202 further executes the computer program codes 206 to perform an estimation of, for illustration, at least one of a performance value, a power value, an area value and a cost value, based on the model 224, by using the technology data 222, to generate result data 140, for the created architecture. For illustration, based on the model 224, the above estimation is performed by obtaining related fabrication process data from the technology data 222, and then using the related fabrication process data to simulate fabrication processes for the created architecture. After the estimation is performed, the result data 140 corresponding to the simulated fabrication processes for the created architecture is generated.

In some embodiments, the result data 140 include data, for example, corresponding to at least one of a performance value, a power value, an area value, and a cost value of the created architecture. In some other embodiments, the result data 140 serves as a basis of implementing the created architecture in fabrication. In some embodiments, the technology data 222 include data related to process technology and relevant parameters of fabrication of the IPs. For illustration, fabrication processes, which are associated with the IPs and applications corresponding to the user-defined requirement 105, are simulated. With the simulation result, the performance value, the power value, the area value, the cost value, or the combination thereof, is estimated. Based on the estimated values, at least one defective architecture that does not meet the user-defined requirement 105 is able to be identified and/or to be removed. For illustration, when an estimated cost value is higher than a predetermined cost value corresponding to the user-defined requirement 105, the estimator 135 identifies that the architecture is defective, and the estimator 135 removes the defective architecture.

In some embodiments, the processor 202 is implemented by, for example, a central processing unit (CPU), a multi-processor, a distributed processing system, an application specific integrated circuit (ASIC), a suitable processing unit, and/or the like. The aforementioned circuits or units to implement the processor 202 are given for illustrative purposes. Various circuits or units to implement the processor 202 are within the contemplated scope of the present disclosure.

In some embodiments, the computer readable storage device 204 is implemented by, for example, electronic device, magnetic device, optical device, electromagnetic device, infrared device, semiconductor device (or apparatus), and/or the like. For example, the computer readable storage device 204 includes a semiconductor memory, a magnetic tape, a removable computer diskette, a random access memory (RAM), a read-only memory (ROM), a rigid magnetic disk, an optical disk, and/or the like. For illustration of the computer readable storage device 204 including optical disks, the computer readable storage device 204 includes, for example, a compact disk-read only memory (CD-ROM), a compact disk-read/write (CD-R/W), a digital video disc (DVD), and/or the like.

In some embodiments, the computer readable storage device 204 stores the computer program codes 206 for performing operations of the model generator 120 and the explorer 130, as illustrated in FIG. 1. In some embodiments, the computer readable storage device 204 also stores instructions 207 for interfacing with external machines and/or equipments. In some embodiments, the processor 202 executes the instructions 207 to generate commands and/or instructions read by manufacturing equipments (not shown) for fabricating semiconductor devices based on the result data 140. For illustration, the result data 140 include data corresponding to different architectures with various values including, for example, at least one of the performance value, the power value, the area value, and the cost value. Based on the result data 140, the processor 202 executes the instructions 207 to generate commands corresponding to a suitable architecture of the different architectures, for available manufacturing equipments (not shown). The available manufacturing equipments then fabricate semiconductor devices or integrated circuits based on the commands.

In some embodiments, the processor 202 is electrically coupled to the computer readable storage device 204 via a bus 208. The processor 202 is able to communicate with the computer readable storage device 204 via the bus 208.

Moreover, in some embodiments, the processor 202 also communicates with various peripheral apparatuses and/or external equipments via the bus 208. For illustration in FIG. 2, the processor 202 is electrically coupled to an I/O interface 210 via the bus 208. The I/O interface 210 is electrically coupled to peripheral apparatuses, including, for example, a display (not shown). The display is implemented by, for example, a cathode ray tube (CRT), liquid crystal display (LCD), and/or the like. Accordingly, the processor 202 is able to communicate with the display through the I/O interface 210. Through the I/O interface 210, the processor 202 also communicates information and/or commands with other peripheral apparatuses including, for example, keyboard, keypad, mouse, trackball, track-pad, touch screen, cursor direction keys, and/or the like. The aforementioned peripheral apparatuses are given for illustrative purposes. Various peripheral apparatuses are within the contemplated scope of the present disclosure. In some embodiments, the I/O interface 210 includes a display. The display is configured to show information on the result data 140 including, for example, a ranking of architecture-technology configurations.

In some embodiments, the processor 202 is also electrically coupled to a network interface 212 via the bus 208, to access a network 214 through the network interface 212. Through the network 214, the processor 202 and the computer readable storage device 204 are able to communicate with external equipments and/or equipments connected to the network 214. In some embodiments, through the network 214, the network interface 212 receives the user-defined requirement 105 as illustrated in FIG. 1. In some other embodiments, the I/O interface 210 receives the user-defined requirement 105. In further embodiments, the network interface 212 transmits the result data 140 to a user device through the network 214. For example, the user device is a computer and/or the like.

The network interface 212, in some embodiments, is implemented by wireless network interfaces and/or wired network interfaces. The wireless network interfaces include, for example, BLUETOOTH, WIFI, WIMAX, GPRS, WCDMA, and/or the like. The wired network interfaces include, for example, ETHERNET, USB, IEEE-1394, and/or the like.

The configuration of the system 200 in FIG. 2 is given for illustrative purposes. Various configurations of the system 200 are within the contemplated scope of the present disclosure. For example, in various embodiments, the computer readable storage device 204 is implemented by a non-transitory computer readable storage medium that is encoded with the aforementioned executable instructions and/or computer program codes for carrying out operations, for example, as will be illustrated in FIG. 3.

FIG. 3 illustrates a flow chart of a method 300 implemented by the system 200 of FIG. 2, in accordance with various embodiments of the present disclosure. The operations of the integrated platform 100 in FIG. 1 and the system 200 in FIG. 2 are described below by the method 300 illustrated in FIG. 3. Labels for different operations of the method 300 are illustratively provided in FIG. 3.

One of ordinary skill in the art would recognize that an order of operations in the method 300 is adjustable. One of ordinary skill in the art would further recognize that additional operations are able to be included in the method 300 without departing from the scope of this description.

For illustration in FIG. 3, in operation 305, the integrated platform 100 provides the IP bank 110, the application bank 112 and the technology bank 116 in FIG. 1. Correspondingly in FIG. 2, the storage device 204 stores IP data 218, application data 220, and technology data 222. For illustration, the IP bank 110 is provided to store the IP data 218 associated with IPs indicating, for example, the processor device ARM Cortex-A7, the processor device ARM M3, the direct memory access (DMA), and the memory devices LPDDR3 and SRAM. The application bank 112 is provided to store the application data 220 indicating relations between applications of products and usages of the IPs. The technology bank 116 is provided to store the technology data 222 associated with process technology and relevant parameters of fabrication of the IPs.

In operation 310, the model generator 120, in some embodiments, generates the hierarchical table 223 based on the IP bank 110. In further embodiments, the model generator 120 generates the hierarchical table 223 based on the IP bank 110 and the application bank 112. Then, the model generator 120 generates the model 224 according to the hierarchical table 223. The model 224, in some embodiments, is associated with IP hierarchy. Correspondingly in FIG. 2, the I/O interface 210 or the network interface 212 receives the user-defined requirement 105 for an integrated circuit, and the processor 202 executes the computer program codes 206 to utilize one or more of the IP data 218 and the application data 220 to create the hierarchical table 223 according to the user-defined requirement 105. Then, the processor 202 executes the computer program codes 206 to generate the model 224 according to the hierarchical table 223. For illustration, the application requirement indicates MP3 playback that, for example, has 128K bits rate, 4 MB file size, 4 minutes length, and stores data in the memory device LPDDR3. For such application requirement, the model 224 includes a database having specifications of the processor device ARM M3, the direct memory access (DMA), the memory devices LPDDR3 and SRAM, which corresponds to the IPs with respect to the operation 305 discussed above.

The hierarchical table 223 includes information on at least one device (not shown) and power definition of sub-blocks (not shown) in the at least one device. The at least one device is implemented by a core device or a non-core device, in some embodiments. In further embodiments, the core device is a main circuit, and the non-core device is a peripheral circuit. For illustration, the product indicated by the user-defined requirement is a processor device ARM Cortex-A7. The processor device ARM Cortex-A7 includes at least one core device and a non-core device. The at least one core device has sub-blocks including, for example, a core circuit ARMv7 32b CPU virtual 40b PA, a data engine NEON, a floating point unit, and memory circuits 16-64k 1-Cache and 16-64k D-Cache. The non-core device has sub-blocks including, for example, a snoop control unit, a memory circuit L2-Cache, and a bus interface. The power definition of each sub-block is associated with IP power granularity indicating various sub-power states including, for example, dynamic and static logic powers, dynamic and static clock powers, dynamic and static SRAM powers, and other dynamic and static powers. The IP power granularity also defines power numbers for these various sub-powers to facilitate the progress of the estimation including, for example, power estimation, based on the model 224, as will be illustrated below.

In operation 315, the explorer 130, in some embodiments, performs the estimation, for illustration, of at least one of a performance value, a power value, an area value and a cost value, based on the model 224, to generate the result data 140, such that the result data 140 serves as a basis of fabrication of a system including, for example, the integrated circuit. In various embodiments, the explorer 130 performs the estimation which corresponds to the hierarchical table 223, by using the technology bank 116, to output the result data 140 as a basis of fabrication of the system, for example, on a chip (SoC) or system on integrated circuit (SOIC) device as discussed above. Correspondingly in FIG. 2, the processor 202 executes the computer program codes 206 to perform the estimation based on the model 224, by using the technology data 222, to generate the result data 140, such that the result data serves as the basis of fabrication of the system including, for example, a camera display system 400 in FIG. 4.

After operation 315, in some embodiments with respect to FIG. 2, the processor 202 executes the instructions 207 to generate commands corresponding to the result data 140, for available manufacturing equipments (not shown). The available manufacturing equipments then fabricate semiconductor devices or integrated circuits based on the commands.

In some embodiments, the hierarchical table 223 is a single hierarchical lookup table (LUT), and the model 224 is a single holistic electronic system level (ESL) model without any dependency. In some embodiments, the single holistic ESL model includes a database having common standard specification for different subsystems, IPs, and/or blocks as discussed above. In such embodiments, the database in the single holistic ESL model is simplified, without linking any other model.

In some approaches, a computer generates various non-hierarchical tables for individual IPs or chips. Then, based on the non-hierarchical tables, the computer generates various models. However, these models have strong dependency with each other, resulting in a long duration of the estimation based on these models.

Compared with the above approaches, the system 200 in FIG. 2, which implements the integrated platform 100 in FIG. 1, performs the estimation based on the single holistic ESL model without any dependency, in some embodiments. As discussed above, the single holistic ESL model includes the simplified database, and accordingly, estimation time required in operation 315 is shortened because of the simplified database.

Figure 4:
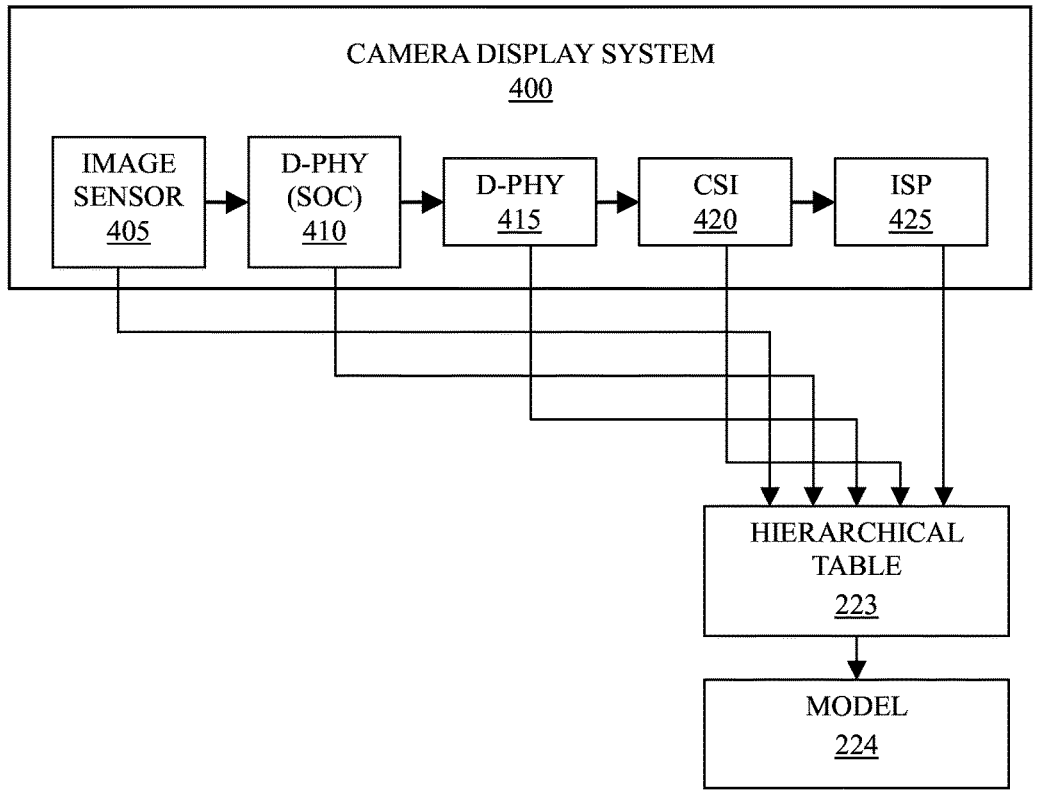
FIG. 4 is a schematic diagram of a system performing operations in FIG. 3, in accordance with various embodiments of the present disclosure.

FIG. 4 is a schematic diagram of a camera display system 400 performing operations in FIG. 3, in accordance with various embodiments of the present disclosure. In some embodiments, the user-defined requirement 105 in FIG. 1 indicates fabrication of the camera display system 400 in FIG. 4. The camera display system 400 includes, for example, an image sensor 405, a D-PHY system on chip (SoC) 410, a D-PHY 415, a camera serial interface (CSI) 420 and an imaging signal processor (ISP) 425. The image sensor 405, the D-PHY SoC 410, the D-PHY 415, the CSI 420 and the ISP 425 are coupled in sequence as illustrated in FIG. 4, and are operated together to sense, transmit and process image data. The hierarchical table 223 is, for illustration, a single hierarchical lookup table (LUT) that gathers individual parameters of the image sensor 405, the D-PHY SoC 410, the D-PHY 415, the CSI 420 and the ISP 425 as a whole for simplification.

Corresponding to the hierarchical table 223 being the single hierarchical LUT, the model 224 is implemented by, in some embodiments, the single holistic ESL model without any dependency, as discussed above. For illustration, the single holistic ESL model includes holistic specifications of the image sensor 405, the D-PHY SoC 410, the D-PHY 415, the CSI 420 and the ISP 425, without linking any other model. In some embodiments with respect to FIG. 2, the processor 202 further executes the computer program codes 206 to obtain related fabrication process data from the technology data 222, in order to simulate, by using only the single holistic ESL model discussed above, fabrication processes for the architecture.

In some approaches, a computer generates various non-hierarchical tables, which do not include the subsystem level, the IP level and the block level as discussed above, for the image sensor 405, the D-PHY SoC 410, the D-PHY 415, the CSI 420 and the ISP 425 in FIG. 4. The non-hierarchical table includes parameters, without having hierarchical levels including, for example, the subsystem level, the IP level, and the block level. Based on the non-hierarchical tables, the computer generates various models including, for example, an image sensor model, a D-PHY SoC model, a D-PHY model, a CSI model and an ISP model. However, the image sensor model, the D-PHY SoC model, the D-PHY model, the CSI model and the ISP model have strong dependency with each other, resulting in a long duration of the estimation based on these models.

Compared with above approaches, as discussed above in operation 310, the hierarchical table 223 is the single hierarchical LUT, and the model 224 is the single holistic ESL model without any dependency, in some embodiments, and thus the estimation time required in operation 315 is shortened. For illustration with respect to FIG. 4, the single hierarchical LUT includes an array of hierarchical levels of parameters of the image sensor 405, the D-PHY SoC 410, the D-PHY 415, the CSI 420 and the ISP 425. The single holistic ESL model includes holistic specifications of the image sensor 405, the D-PHY SoC 410, the D-PHY 415, the CSI 420 and the ISP 425. Accordingly, with reference to FIG. 2, the processor 202 executes the computer program codes 206 to obtain related fabrication process data from the technology data 222 by using the single holistic ESL model, without linking any other model. Then, the processor 202 further executes the computer program codes 206 to use the related fabrication process data to simulate fabrication processes for the created architecture. By using the single holistic ESL model, without linking any other model, the estimation time required in operation 315 is shortened.

In some embodiments, a method is disclosed that includes providing an IP bank, an application bank, and a technology bank; generating a hierarchical table based on the IP bank and the application bank; performing an estimation of at least one of a performance value, a power value, an area value and a cost value, which corresponds to the hierarchical table, by using the technology bank, to output an result data as a basis of fabrication of a system.

Also disclosed is a non-transitory computer readable medium comprising computer executable instructions for carrying out a method is disclosed, and the method includes generating, by a model generator, a model associated with IP hierarchy; performing, by an explorer, an estimation of at least one of a performance value, a power value, an area value and a cost value, based on the model, to generate result data, such that the result data serves as a basis of fabrication of a system.

Also disclosed is a system is disclosed that includes an interface, a storage device and a processor. The interface is configured to receive a user-defined requirement for an integrated circuit. The storage device is configured to store IP data, application data, and technology data. The processor is programmed to utilize one or more of the IP data and the application data to create a hierarchical table according to a user-defined requirement, generate a model according to the hierarchical table, and perform an estimation of at least one of a performance value, a power value, an area value and a cost value, based on the model, by using the technology data, to generate result data, such that the result data serves as a basis of fabrication of the integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   providing an intellectual property (IP) bank, an application bank, and a technology bank, the IP bank comprising data associated with IPs and configurations of the IPs, the application bank comprising data associated with a relation between applications of products and usages of the IPs;
   generating a hierarchical table based on the IP bank and the application bank, wherein the hierarchical table is generated by:
   in response to an application requirement corresponding to a product, accessing the application bank in order to determine suitable IPs for constituting the product; and
   accessing the data of the IP bank, in order to collect configurations of the suitable IPs into the hierarchical table; and
   performing an estimation of at least one of: a performance value, a power value, an area value, and a cost value, which corresponds to the hierarchical table, by using the technology bank, to output result data as a basis of fabrication of a system.

2. The method of claim 1, wherein the technology bank comprises data associated with process technology and relevant parameters of fabrication of the IPs.

3. The method of claim 1, wherein the hierarchical table comprises information on at least one device and power definition of sub-blocks in the at least one device.

4. The method of claim 1, wherein the hierarchical table comprises hierarchical levels defining information and/or parameters associated with IPs.

5. The method of claim 1, wherein the estimation is a system-level performance, power, area and cost (PPAC) estimation.

6. The method of claim 1, further comprising:
based on architecture-technology configurations of the result data, fabricating at least one integrated circuit of the system.

7. The method of claim 1, wherein the result data comprises a ranking of architecture-technology configurations.

8. A non-transitory computer readable medium comprising computer executable instructions for carrying out a method, the method comprising:
providing a hierarchical table based on an intellectual property (IP) bank and an application bank, the IP bank comprising data associated with IPs and configurations of the IPs, the application bank comprising data associated with a relation between applications of products and usages of the IPs, wherein the hierarchical table is provided by:
in response to an application requirement corresponding to a product, accessing the application bank in order to determine suitable IPs for constituting the product; and
accessing the data of the IP bank, in order to collect configurations of the suitable IPs into the hierarchical table;
generating, by a model generator, a model associated with IP hierarchy based on the hierarchical table; and
performing, by an explorer, an estimation of at least one of a performance value, a power value, an area value, and a cost value, based on the model corresponding to the hierarchical table, to generate result data, such that the result data serves as a basis of fabrication of a system.

9. The non-transitory computer readable medium of claim 8, wherein the hierarchical table comprises information on at least one device and power definition of sub-blocks in the at least one device.

10. The non-transitory computer readable medium of claim 8, wherein the hierarchical table comprises hierarchical levels defining information and/or parameters associated with the IPs.

11. The non-transitory computer readable medium of claim 8, wherein the model is a holistic electronic system level (ESL) model.

12. The non-transitory computer readable medium of claim 11, wherein the estimation is a system-level PPAC estimation based on the holistic ESL model.

13. The non-transitory computer readable medium of claim 11, wherein the the model is a single holistic electronic system level (ESL) model without linking to any other model.

14. The non-transitory computer readable medium of claim 8, wherein the method further comprises:
based on architecture-technology configurations of the result data, generating commands for fabricating at least one integrated circuit of the system.

15. A system, comprising:
an interface configured to receive a user-defined requirement for an integrated circuit;
a storage device configured to store intellectual property (IP) data, application data, and technology data, the IP data comprising data associated with IPs and configurations of the IPs, the application data comprising data associated with a relation between applications of products and usages of the IPs; and
a processor programmed to:
utilize one or more of the IP data and the application data to create a hierarchical table according to the user-defined requirement, wherein the hierarchical table is created by:
in response to an application requirement corresponding to a product, accessing the application data in order to determine suitable IPs for constituting the product; and
accessing the data of the IP data, in order to collect configurations of the suitable IPs into the hierarchical table;
generate a model according to the hierarchical table; and
perform an estimation of at least one of a performance value, a power value, an area value, and a cost value, based on the model corresponding to the hierarchical table, by using the technology data, to generate result data, such that the result data serves as a basis of fabrication of the integrated circuit.

16. The system of claim 15, wherein the technology data comprises data associated with process technology and relevant parameters of fabrication of the IPs.

17. The system of claim 15, wherein the hierarchical table comprises information on at least one device and power definition of sub-blocks in the at least one device.

18. The system of claim 15, wherein the hierarchical table comprises hierarchical levels defining information and/or parameters associated with IPs.

19. The system of claim 15, wherein the model is a holistic ESL model, and the estimation is a system-level PPAC estimation based on the holistic ESL model.

20. The system of claim 15, wherein based on architecture-technology configurations of the result data, the processor is further programmed to generate commands for fabricating the integrated circuit.

* * * * *